US006650655B2

(12) United States Patent
Alvesalo et al.

(10) Patent No.: US 6,650,655 B2
(45) Date of Patent: *Nov. 18, 2003

(54) ALLOCATION OF DATA TRANSMISSION RESOURCES BETWEEN DIFFERENT NETWORKS

(75) Inventors: Antero Alvesalo, Espoo (FI); Mika Rinne, Espoo (FI); Hannu Hakkinen, Espoo (FI); Oscar Salonaho, Helsinki (FI)

(73) Assignee: Nokia Corporation, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/536,213

(22) Filed: Mar. 27, 2000

(65) Prior Publication Data

US 2002/0186710 A1 Dec. 12, 2002

Related U.S. Application Data

(63) Continuation of application No. PCT/FI98/00765, filed on Sep. 29, 1998.

(30) Foreign Application Priority Data

Sep. 29, 1997 (FI) .................................................. 973837

(51) Int. Cl.$^7$ ................................................. H04J 3/16
(52) U.S. Cl. ..................... 370/468; 370/330; 370/341; 370/436; 370/437; 455/450
(58) Field of Search ................................. 370/329, 330, 370/331, 335, 336, 337, 341, 342, 343, 344, 345, 441, 442, 445, 422, 468, 465; 455/436, 450, 451, 452, 453, 437

(56) References Cited

U.S. PATENT DOCUMENTS 5,471,671 A * 11/1995 Wang et al. ................. 375/224
5,513,379 A * 4/1996 Benveniste et al. .......... 455/451
5,574,984 A * 11/1996 Reed et al. .................... 455/69

(List continued on next page.)

FOREIGN PATENT DOCUMENTS

| EP | 0 639 929 | 2/1995 |
| WO | 97/09838 | 3/1997 |
| WO | 97/15995 | 5/1997 |

OTHER PUBLICATIONS

"Channel Assignment Schemes for Cellular Mobile Telecommunication Systems: A Comprehensive Survey" Katzela, et al. IEEE Personal Communications, Jun. 1996, pp. 10–31.

Primary Examiner—Douglas Olms
Assistant Examiner—Bob A. Phunkulh
(74) Attorney, Agent, or Firm—Squire, Sanders & Dempsey L.L.P.

(57) ABSTRACT

The idea of the invention is the allocation of transmission resources in several separate steps. In the first step, the available transmission resources are dynamically divided between the different networks. In the second step, the networks divide the resources that have been allocated for their use among their users by their own channel allocation methods. In one embodiment, a given minimum capacity wherewith the network achieves a predetermined minimum quality of service is permanently allocated to some or all of the networks. As the capacity requirement increases, the necessary amount of additional capacity is allocated to the operator in excess of this minimum capacity. The additional capacity is then allocated either from resources separately reserved for this purpose that are common to the networks, or by borrowing it from capacity that is allocated to another network but falls outside the minimum capacity of said network. In accordance with one embodiment, an upper limit is set for the transmission capacity allocated to a network, in excess of which no capacity can be allocated to the network. The dynamic distribution of capacity between networks can be realized either in a centralized or in a distributed manner. If the division is performed in a distributed manner for example in such a way that each network independently allocates a band to itself, the algorithms used in the different networks must be compatible.

5 Claims, 4 Drawing Sheets

U.S. PATENT DOCUMENTS

| | | | | |
|---|---|---|---|---|
| 5,722,043 A | * | 2/1998 | Rappaport et al. | 455/33.1 |
| 5,805,633 A | * | 9/1998 | Uddenfeldt | 370/335 |
| 5,809,423 A | * | 9/1998 | Benveniste | 455/452 |
| 5,937,353 A | * | 8/1999 | Fapojuwo | 455/444 |
| 6,023,622 A | * | 2/2000 | Plaschke et al. | 455/452 |
| 6,112,092 A | * | 8/2000 | Benveniste | 455/450 |
| 6,223,041 B1 | * | 4/2001 | Egner et al. | 455/450 |

* cited by examiner

CHANNEL NEED

ALLOCATION OF DATA TRANSMISSION RESOURCES BETWEEN DIFFERENT NETWORKS

This application is a continuation of international application serial number PCT/FI98/00765, filed Sep. 29, 1998.

FIELD OF THE INVENTION

The present invention relates to allocation of data transmission resources particularly in mobile communications systems.

BACKGROUND OF THE INVENTION

In telecommunications systems, the parties to the transmission communicate with one another utilizing the transmission resources allocated to the system. The transmission resources are divided into channels. It is essential for the success of the data transmission that the channel used on the connection is free from interference and noise to such an extent that the receiver can sufficiently faultlessly interpret the information sent by the transmitting party from the signal received from the channel. Interference is constituted by interference signals caused by other connections to the channel, and it has particular importance in wireless systems, such as mobile communications systems.

In mobile communications systems, the mobile stations and base stations can establish connections via a radio interface. A specific frequency band has been allocated as a transmission resource. This frequency band is further divided permanently between various networks. In the context of the present application, the term network denotes a telecommunications network operated by one network operator according to one system. Each network divides the frequency band allocated for its use further into channels. In order that sufficient capacity may be obtained for the mobile communications system on this limited frequency band, the available channels must be reused several times. The coverage area of the system is therefore divided into cells constituted by the radio coverage areas of individual base stations, wherefore such systems are often also termed cellular radio systems.

The air interface between the base stations and mobile stations can be divided into channels in several ways. Known ways include time division multiplexing TDM, frequency division multiplexing FDM, and code division multiplexing CDM. In TDM systems, the available bandwidth is divided into successive time slots. A given number of successive time slots forms a periodically recurring time frame. The channel is determined by the time slot used in the time frame. In FDM systems, the channel is determined by the frequency used, and in CDM systems by the frequency hopping pattern or spreading code used. Also combinations of the above division methods may be used.

To maximize the capacity, it is attempted to reuse the channels in cells as close as possible, yet so that the quality of the connections using the channels remains sufficiently good. Connection quality is influenced by the sensitivity of the transferred information to transmission errors arising on the radio channel and by the radio channel quality. The transmission error tolerance of the signal is dependent on the properties of the transferred information, and it can be improved by processing the information prior to its transmission onto the channel by channel coding and interleaving and by using re-transmission of faulty transmission frames. The radio channel quality is represented by the carrier-to-interference ratio CIR, which is the ratio of the strength of the signal sent by the transmitter and the interference caused by other connections on the channel as experienced by the receiver on the connection.

The magnitude of interference caused by connections to each other is dependent on the channels used by the connections, the geographic location of the connections and the transmit power used. These factors can be influenced by planned channel allocation to different cells which takes interference into account, dynamic control of the transmit power, and averaging of the interference experienced by the different connections.

To maximize the utilization of the available transmission capacity, various channel allocation methods have been developed. The aim in channel allocation is to allocate for desired connections channels all of which can be utilized simultaneously whilst the signal quality remains acceptable. To maximize capacity, the channels should be reused as close as possible.

Known channel allocation methods include fixed channel allocation FCA, dynamic channel allocation DCA and hybrid channel allocation HCA, which is a combination of FCA and DCA. The idea in fixed channel allocation is to divide the channels available to the system between the cells already in frequency planning performed prior to the commissioning of the system. In dynamic channel allocation, all channels are in a common pool of channels, wherefrom the best channel is selected for use for the connection to be established on the basis of a predetermined norm. In hybrid channel allocation, some of the channels available to the system are permanently divided for the use of different cells as in FCA, and the remainder are placed in a channel pool wherefrom they can be taken dynamically as required for the use of any cell. The different methods have been thoroughly described in I. Katzela and M. Naghshineh, *Channel Assignment Schemes for Cellular Mobile Telecommunications Systems: A Comprehensive Survey,* IEEE Personal Communications, pp. 10–31, June 1996.

Known methods for equalizing interference between different connections include frequency hopping in FDM systems and time slot hopping in TDM systems. In CDM systems, interference between connections is equalized by using sufficiently dissimilar spreading codes. On the other hand, in the method all connections utilize the same frequency, which considerably increases the average of mutual interference.

In frequency hopping, the frequency of the connection is changed at frequent intervals. The methods can be divided into rapid and slow frequency hopping. In rapid frequency hopping, the frequency of the connection is changed more frequently than the carrier frequency used. In slow frequency hopping, on the other hand, the frequency of the connection is changed less frequently than the frequency of the carrier frequency used.

In the known GSM system, for instance, frequency hopping is implemented in such a way that an individual burst is always sent at one frequency, and the burst to be sent in the next time slot at another frequency. In such a case, an individual burst may experience a high interference level. However, on account of channel coding and interleaving it suffices for good connection quality that a sufficient portion of the bursts can be transferred without appreciable interference. Frequency hopping allows this condition to be fulfilled connection-specifically, even though some of the bursts were to suffer considerable interference.

Time slot hopping is based on a similar principle as frequency hopping. In time slot hopping, the time slot utilized on the connection is changed instead of frequency. Also the hopping patterns in time slot hopping should be independent of one another in cells located close to one another to achieve the best result.

The capacity of a telecommunications network is ultimately limited by the frequency band permanently allocated for the use of the network. In telecommunications, the capacity requirement is of a statistical nature. Calls are initiated and terminated independently of one another, as a result of which the traffic level varies. The quantity of traffic and the number of channels needed to meet the traffic level can be given a probability distribution. FIG. 1 shows an example of the probability distribution of the channel requirement. The figure considers the probability distribution of the channel requirement in a situation in which the time-dependent channel requirement is 24 channels on an average, and the standard deviation for the channel requirement is about five channels. The operator has 30 channels at his disposal. If the traffic poses a requirement of more than 20 channels, it is not possible to serve all users but blocking occurs. In the case of the figure, all 30 channels are in use 7.7 percent of the time, and thus a user attempting a connection in the operator's network will experience blocking with a probability of 7.7 percent. If another operator is operative in the same area, having a similar number of channels at his disposal and experiencing a similar channel requirement, one of the operators will presumably have vacant capacity while the users of the other operator experience blocking.

On account of the statistical nature of traffic, the capacity of one network may be fully occupied in a given area, thus causing blocking of new calls that should be established, even though another network simultaneously has a large amount of unused capacity in that area. This situation is shown in FIG. 2, which illustrates the distribution and use of transmission resources in an area. In the figure, frequencies F1–F9 constituting the transmission resources are divided between three networks in such a way that network 1 has been assigned frequencies F1, F2 and F3 for its use, network 2 frequencies F4, F5 and F6, and network 3 frequencies F7, F8 and F9.

The channels used by the connections are shown as hatched in FIG. 2. The unhatched area depicts the idle channels. Of the resources allocated to network 1, the network utilizes frequency F1 in full and eight of the ten channels established at frequency F2. Frequency F3 is completely free. At the point of consideration, network 2 utilizes all frequencies F4, F5 and F6 allocated to it in full. Network 3 utilizes frequency F9 in full, 3/10 of frequency F8, and frequency F7 allocated to it is free. Hence, in the situation shown in the figure the users of network 2 experience blocking, although all resources available in the area are not in use.

As the number of mobile subscribers increases and applications requiring wide bandwidth, such as multimedia applications, become more common, the prior art channel allocation methods are no longer capable of utilizing the available frequency spectrum efficiently enough. Special problems are presented by situations in which the limited frequency band is jointly used by several different systems, such as a mobile communications system and a cordless office system. It is an object of the present invention to alleviate these problems by rendering the allocation of transmission resources more effective. This object is achieved with the method disclosed in the independent claim.

SUMMARY OF THE INVENTION

The idea of the invention is the allocation of transmission resources in several separate steps. In the first step, the available transmission resources are dynamically divided between the different networks. In the second step, the networks divide the resources that have been allocated for their use among their users by their own channel allocation methods.

In one embodiment, a given minimum capacity wherewith the network achieves a predetermined minimum quality for its service is permanently allocated to some or all of the networks. As the capacity requirement increases, the necessary amount of additional capacity is allocated to the operator in excess of this minimum capacity. In such a case, the additional capacity is allocated either from resources separately reserved for this purpose that are common to the networks, or by borrowing it from capacity that is allocated to another network but falls outside the minimum capacity of said network.

In accordance with one embodiment, an upper limit is set for the transmission capacity allocated to a network, in excess of which no capacity can be allocated to the network.

The dynamic distribution of capacity between networks can be realized either in a centralized or in a distributed manner. If the division is performed in a distributed manner for example in such a way that each network independently allocates a band to itself, the algorithms used in the different networks must be compatible.

The amount of capacity to be allocated for the use of a network can be influenced for instance by the traffic load and the forecast on its behaviour in the immediate future, contracts between the operators, transmit power levels used, and results of measurements on radio path signals. On the basis of such measurement results, it can for example be concluded how great an increase additional capacity allocated to the network will make on the information transfer rate, in other words, what the frequency performance of the network is.

BRIEF DESCRIPTION OF THE DRAWINGS

In the following the invention will be described in greater detail with reference to the accompanying drawings, in which.

DETAILED DESCRIPTION OF THE INVENTION

Figure 3:
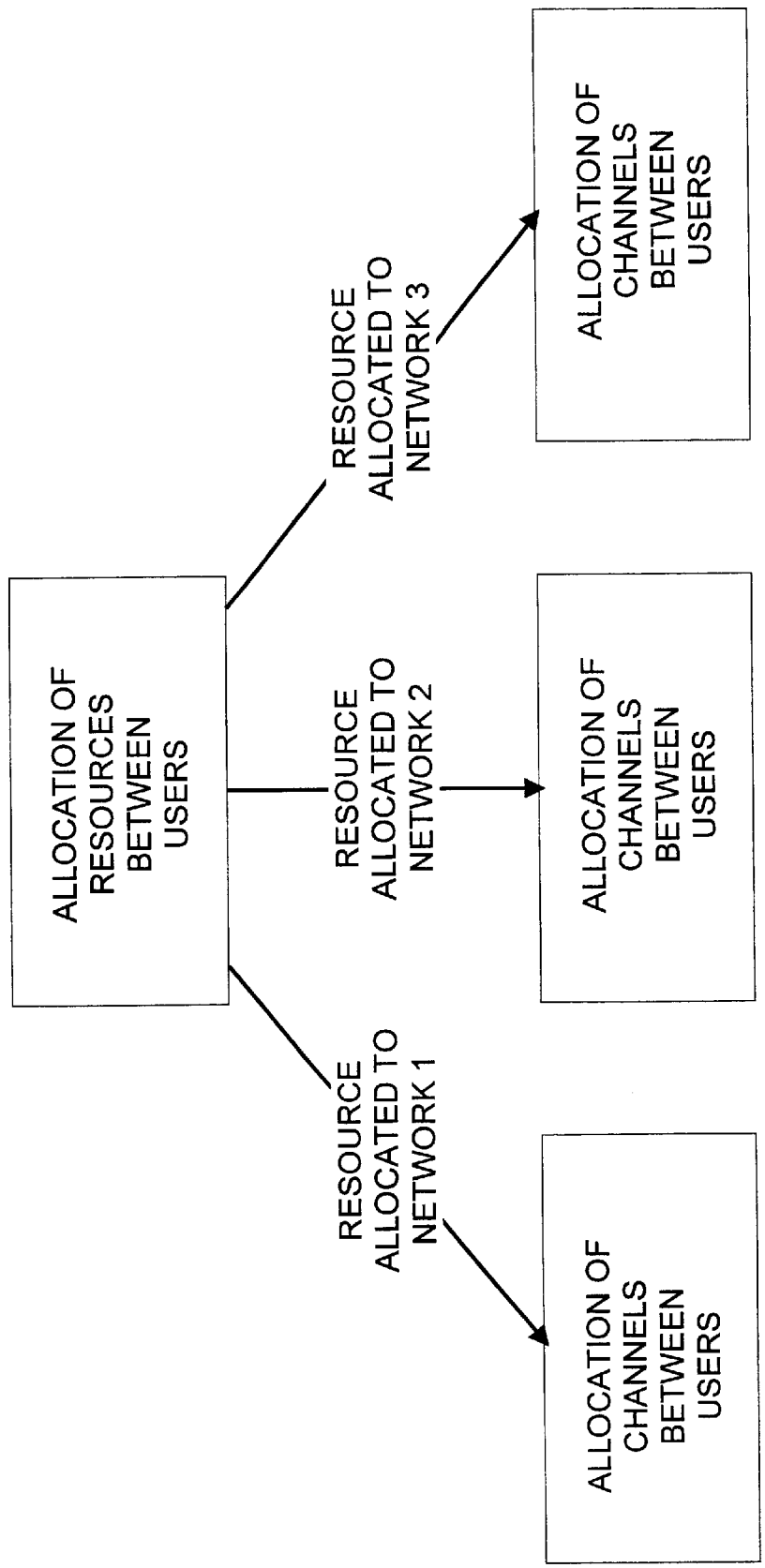
FIG. 3 illustrates a resource allocation method in accordance with the invention.

The basic idea of the invention is shown in FIG. 3. The resources are allocated in two steps. In the first step P1, the resources are divided by dynamic frequency allocation DFA between the different networks. In the example shown in the figure, there are three networks dividing the resources, i.e. networks 1, 2 and 3. The dynamic frequency allocation can be implemented either in a centralized or in a distributed manner. If the allocation is performed in a distributed manner so that each operator adaptively determines the band belonging to him on the basis of measurements and predetermined parameters, the operators must naturally agree on the algorithm to be used for the allocation in advance. The frequencies are allocated for the use of the operators for five seconds at a time, for example.

In the second step, the networks divide the frequency resources assigned to them dynamically among their users. In this step, the operator of each network can use its very own allocation methods that are independent of those of others. For instance, channel allocation in network 1 may utilize centralized dynamic channel allocation and channel allocation in networks 2 and 3 various distributed dynamic channel allocation methods.

Figure 2:
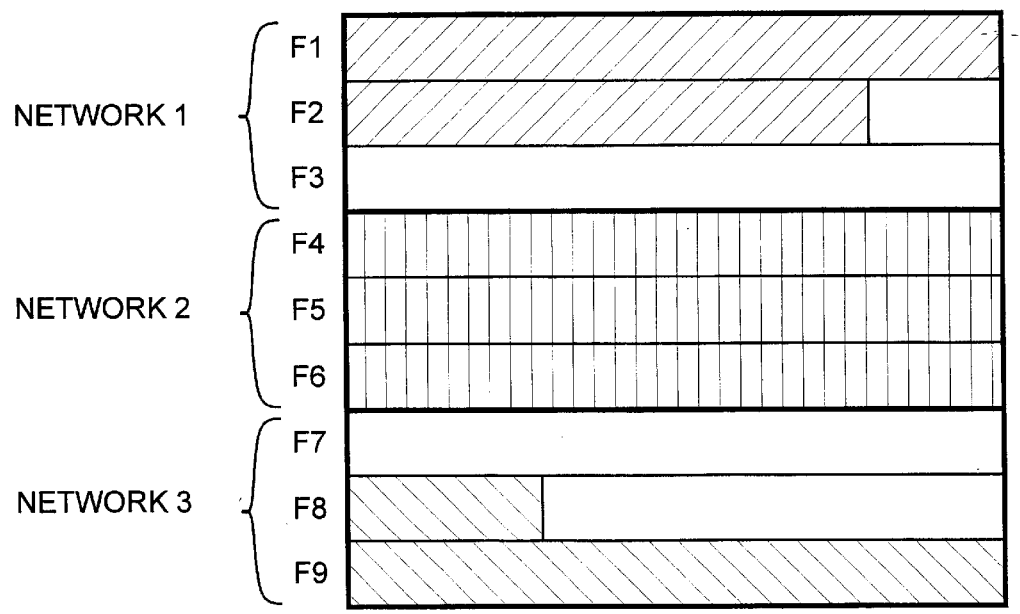
FIG. 2 illustrates frequencies allocated for the use of three different operators and the use thereof.
Figure 4:
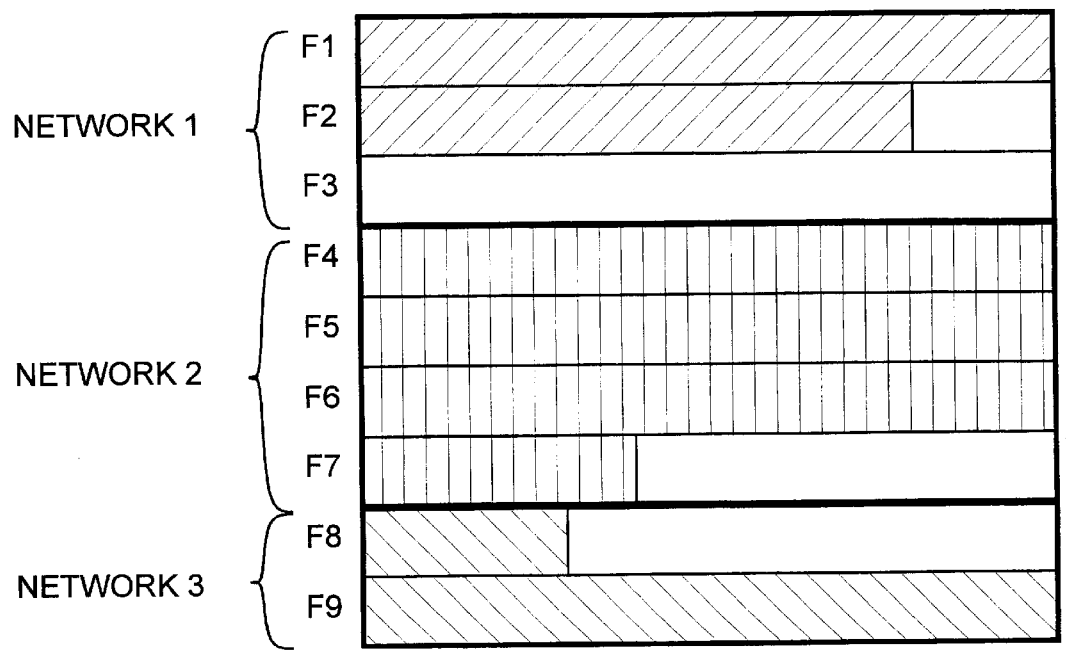
FIG. 4 illustrates frequencies dynamically allocated for the use of three different operators and the use thereof.

In accordance with the invention, in the situation of FIG. 2 the number of frequencies allocated to network 2 is increased by borrowing frequency F7 from network 3 for the use of network 2. Frequencies F1, F2 and F3 are still allocated to network 1. The frequency distribution obtained is shown in FIG. 4. The channels used by connections are shown as hatched in the figure. The unhatched area represents free channels. Network 2 has taken into use four of the ten channels set up at frequency F7. All networks have available a few channels that are free at the moment shown in the figure, on which they can place possible new connections to be established. Hence, none of the network users experience blocking.

The traffic situation can be inferred for example by signal measurements carried out on the frequencies or by utilizing the information obtained from the network elements responsible for channel allocation in the different networks. If the allocation is performed in a distributed manner, the traffic situations in the different networks must be inferred either on the basis of signal measurements or by signalling set up between the different networks. For example, a signalling channel between the base stations which is separately allocated for this purpose or fixed signalling networks may be used for such signalling. If the allocation is performed in a centralized manner, the traffic situation data can be transferred from the elements responsible for channel allocation in the networks to the network element responsible for inter-network frequency allocation using the same signalling paths that are used for indicating to the networks the frequencies allocated for the use of the network.

If several networks have a similar channel structure, the transmission resources can also be allocated for the use of the network with an accuracy of individual channels. In such a case, the resources could be allocated for example in such a way that the first five time slots at frequency F7 are allocated to network 2 and the remaining five time slots to network 3. In that case, however, all time slots can be used only if the networks are precisely synchronized. Otherwise for instance-time slots 5 and 10 must be left vacant to prevent overlapping of signals of the connections of the different networks.

Frequencies can also be allocated for the use of networks asymmetrically; that is, in a different number for traffic in the different transmission directions. Such asymmetrical allocation is advantageous in situations where there is particularly high traffic on the network in one of the transmission directions. This will be the case for example if the network includes a large number of subscribers using servers located in a fixed network. In such a case, the mobile subscribers only send to the server short control messages which do not require a large transmission capacity to be transported. Respectively, in response to such control messages the server sends to the mobile subscribers photographs, for instance, containing a large amount of information and thus requiring a large amount of transmission capacity. In that case, a larger amount of frequencies is asymmetrically allocated for the use of the network in the direction from base station to mobile station than in the direction from mobile to base.

In addition to the embodiment shown in FIGS. 2 and 4, the invention can also be implemented by allocating a given minimum bandwidth to the operators and leaving part of the frequencies unallocated. In such a case, the operators do not borrow frequencies from one another, but the additional frequencies are allocated from resources separately reserved for this purpose. Also the maximum amount of frequencies to be allocated to a network can be limited.

The guard bands left between the frequencies allocated to different networks to diminish interference unnecessarily consume bandwidth, and their use should therefore be avoided. In order that the guard bands may be omitted, the networks must be capable of allocating the channels among their users in such a way that connection quality will remain sufficiently good despite the interference caused by other networks. This can be realized for example by using more efficient channel coding on connections established on channels suffering from major interference.

It is to be noted that the frequencies allocated to a network need not necessarily be adjacent. If frequencies relatively far apart are allocated for the use of the network, frequencies relatively far apart can be selected for the use of an individual connection. The signal fading due to multipath propagation is thus rather different on channels having different frequencies; the best channel in terms of fading properties can be selected from these for the use of the connection.

Figure 1:
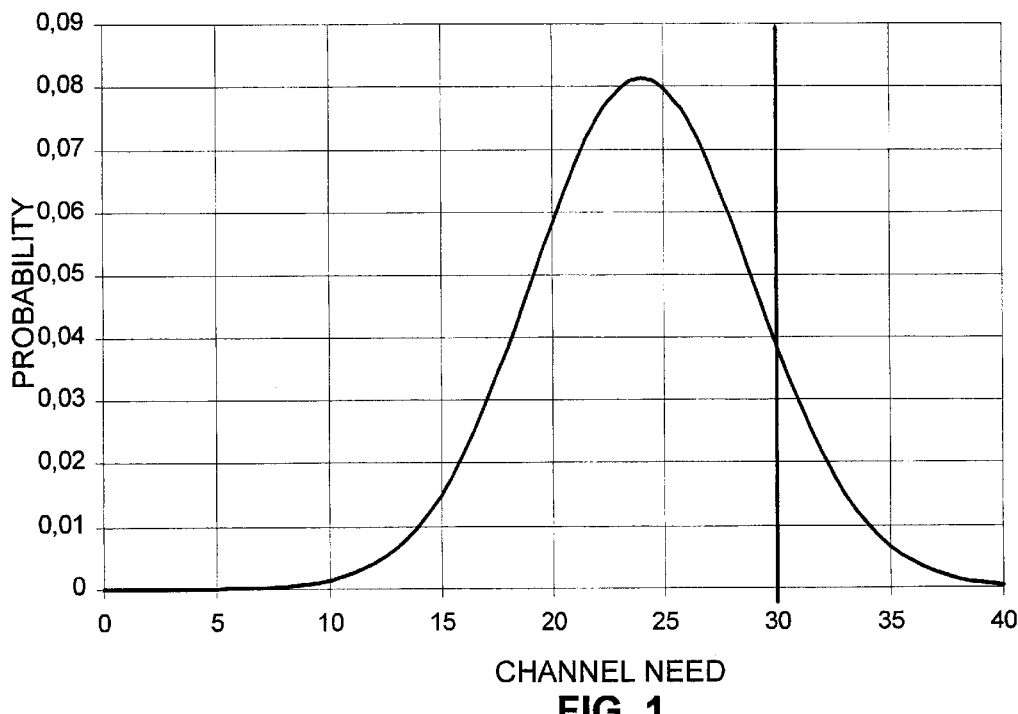
FIG. 1 illustrates the probability distribution of the channel requirement.
Figure 5:
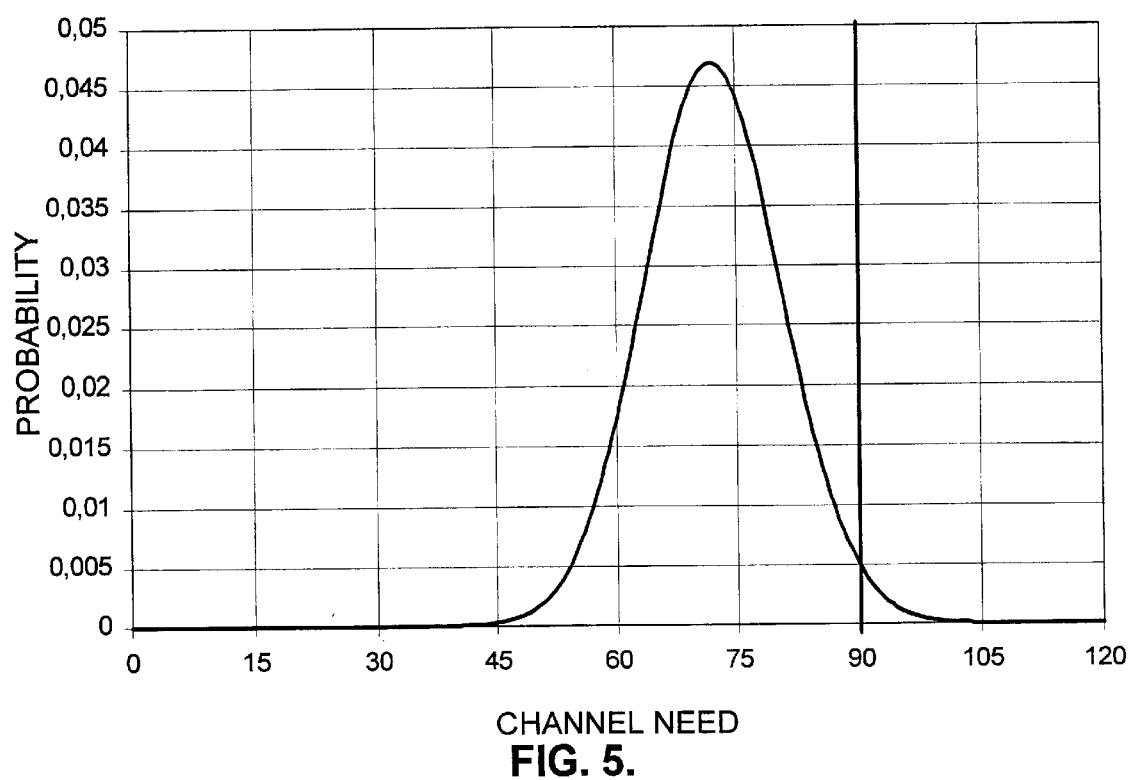
FIG. 5 illustrates the probability distribution of the channel requirement.

The method of the invention affords a better utilization ratio for the resources. This is to be seen from the probability distribution for the channel requirement shown in FIG. 5. In the figure, the joint capacity requirement of three networks is considered. The capacity requirements of the individual networks are as shown in FIG. 1, i.e. 24 channels on an average. The joint channel requirement is 3*24=72 channels on an average. Since variations of channel requirement in the different networks are mutually independent, the deviation of the requirement does not increase in the same proportion. This will be seen as the acuteness of the distribution of FIG. 5 as compared to the distribution of FIG. 1. The sharpening phenomenon of the distribution is generally termed statistical overlap.

The networks jointly share a total of 3*30=90 channels. On account of the statistical overlap, with the method of the invention all channels are in use only 1.3 percent of the time. Hence, the method provides for all networks a considerably reduced probability of blocking for a call being established.

Allocation of a given minimum capacity for the use of the networks does not necessarily affect the advantage gained with the dynamic frequency allocation. If, for example, ten channels were permanently allocated for each network, all of these would be in use practically all the time at the traffic loads exemplified. This permits the use of all available resources. At the same time, however, each network can be assigned a certain minimum capacity that is always available to the network.

Likewise, setting an upper limit for the number of frequencies to be allocated to a network does not significantly lessen the advantage achieved with the dynamic allocation. Also this can be seen from FIG. 1. Restricting the maximum number of frequencies to be allocated to forty, for instance, does not cause any significant blocking, as an individual network only needs to use 40 channels simultaneously approximately 0.05 percent of the time.

In the simplified example presented above, frequencies were allocated for the use of networks purely on the basis of the channel requirement of the networks. It is preferable, however, to utilize also other parameters in the allocation. Suitable parameters include capacity requirement and forecast on its development transmit powers used minimum band allocated to network maximum band to be allocated to network bandwidth utilization efficiency energy used to transmit one bit, and signal reception efficiency per bit.

The capacity requirement is naturally a very important measure in the allocation of resources for the use of different networks. As the capacity requirement of the network increases, an attempt is always made to allocate more resources, i.e. radio frequencies, to the network. The capacity requirement will be seen as the channel utilization rate. Information on the channel utilization rate can be obtained either directly from the network elements attending to the channel allocation or by means of signal strength measurements carried out on the frequencies in the radio path. The networks also have information on the development of the capacity requirement in the immediate future and on the duration of the requirement. Such information may be accrued e.g. from the number of data packets in the transmission buffers.

The transmit power is the basic measure for the interference caused by a connection to its environment. For a network utilizing low transmit powers, a smaller number of frequencies is sufficient for achieving the same transmission capacity. This is due to the fact that the network can reuse the same channel on geographically closely located connections. Connections utilizing a high transmit power cause high interference to their environment, and therefore it is preferred to allocate bandwidth to a network utilizing a lower transmit power and thus not interfering with the other networks to an equal degree. The transmit powers used can be determined for example as Equivalent Isotropic Radiated Power (EIRT), which is obtained as the product of the transmit power and the antenna gain.

Either the mean or the peak value of the EIRT in the area considered can be used as a measure. Since the essential purpose of the transmit power criterion is to keep the interference levels on the radio band sufficiently low, special weight should be attached to it. For this reason, it is preferable to use the peak value of the EIRT as the measure for the transmit power.

The use of the transmit power in the allocation provides an incentive to cell sectorization and to the use of adaptively directed antennas. In these methods, the signals are directed toward the receiver, and thus the information can be transferred with a lower transmit power.

There are several alternatives for calculating the transmit power. The transmit power in the downlink direction, from the base station to the mobile station, is the simplest to determine and measure. In most cases it is sufficient to measure this transmit power. However, it is also justified to take into account the transmit powers used in the uplink direction from the mobile station to the base station in the frequency allocation, especially on connections comprising a large amount of uplink traffic.

The minimum band allocated for the use of a network in a given allocation area may be either a constant determined in the licensing stage of the network or a value determined for the entire transmission band, being common to all networks. The minimum bandwidth is allocated to a network every time it needs it. If the network does not need its entire minimum band, resources of the minimum band can advantageously be lent to other networks to use. The sum of the minimum bands of all networks must naturally be smaller than the entire available band. In allocating frequencies for the use of a network, the minimum bandwidth parameter is of course utilized in such a way that a minimum bandwidth is first allocated for the use of each network. For capacity requirements exceeding the capacity of this band, additional capacity is dynamically allocated for the use of the network.

The maximum band to be allocated for the use of an individual network in the allocation area is preferably below the total bandwidth. However, the sum of the maximum bandwidths of all networks may be greater than the total bandwidth. The maximum bandwidth is used in the allocation to set an upper limit to the joint bandwidth of the frequencies to be allocated to a network.

The maximum bandwidth can be determined either administratively in the licensing stage of the network or as a value common to all networks in a given allocation area.

An allocation area that is used is typically an area made up by several cells. Thus, the operator can improve the capacity of his network by maximizing the frequency utilization efficiency, that is, by re-using the same channels as close to one another as possible.

By bandwidth utilization efficiency is meant the data transmission rate of the network divided by the bandwidth allocated for the use of the network, and its unit may be for example bits per second/Hertz (bps/Hz). Also this parameter is looked at as an average calculated across the allocation area.

By using the bandwidth utilization efficiency as the parameter to be employed in band allocation, the band allocated to a network is made dependent on the capacity requirement of the network and on the bandwidth needed by the network to meet the capacity requirement. Hence, for example in situations where there is no sufficient bandwidth to serve all users of all networks, more bandwidth can be allocated to the networks having the highest bandwidth utilization efficiency. Likewise, networks having a lower bandwidth utilization efficiency can be allocated more bandwidth to meet the same capacity requirement.

The energy used for sending one bit is the lower the more effective channel coding is used on the connection. Bandwidth is allocated the more easily the lower transmission energy per bit is used in the network. The use of this parameter together with bandwidth utilization efficiency provides an incentive for using optimal channel coding and thereby contributes to improving the total of transmission capacity achieved on the entire band.

The energy of received bit represents the excess of transmit power used in the radio path. If the energy of the received bit is too high in view of correct interpretation of the bit, also the power used in transmitting the bit and thereby the interference caused to other connections has been unnecessarily high. By using this parameter, for example networks having the most effective bandwidth utilization can be favoured by allocating more bandwidth to the networks producing the least interference to other networks, that is, having the lowest energy per received bit.

Let us consider in the following an example of a distributed method by which frequencies can be dynamically distributed between different networks. The method works in such a way that the system initially reserves one frequency, a master frequency, from the entire frequency range of the band for its operation. This frequency may be allocated administratively to a given network, for example by licensing or by agreement between the operators. Alternatively, this frequency can be selected by measurement, i.e. by selecting a frequency that is found, on the basis of measurements, to be free. If the interference situation at the master frequency becomes poor on account of load increase in the pertinent cell, load increase in the neighbouring cell or increased interference caused by the neighbouring cell, the method starts occupying new frequencies.

The occupation of a new frequency may be effected on two different levels. The first level comprises taking a new frequency into the use of the network at normal transmit power. On this level, the cell structure of the network is not changed in any way, but additional channels are allocated for the use of the network or channels are removed from the use of the network. The allocation is based on interference measurements carried out on all frequencies of the available band. Of these frequencies, the network seizes frequencies to meet its current capacity requirement.

To equalize interference, frequency hopping is preferably used in the network, and the frequency hopping patterns utilize all frequencies allocated for the use of the network. The frequency hopping pattern is changed and signalled in such a way that the interference experienced by the different connections can be averaged as well as possible. The method in which the set of frequencies is utilized may be random or systematic.

A reverse operation to frequency occupation is freeing of frequencies. A frequency is released if it is no longer needed on account of decreased traffic load, or if it is found to be too suspect to interference. The preferable way is to release the frequency having the poorest quality on the basis of measurements carried out on the signal quality.

If, in a network utilizing frequency hopping, connection quality is found to be poor at specific frequencies, the sequence in time of the frequencies used can first be changed. If the frequency is found to be poor irrespectively of the point of time at which this frequency is hopped onto, it can be concluded that another network is also active at that frequency in the same area. If the results of quality or interference measurements exceed a change threshold, this poor frequency is released from use. The new frequency hopping is again adapted between the available frequencies to suitable time sequences. This is signalled to the mobile stations as a changed hopping pattern.

Figure 6A:
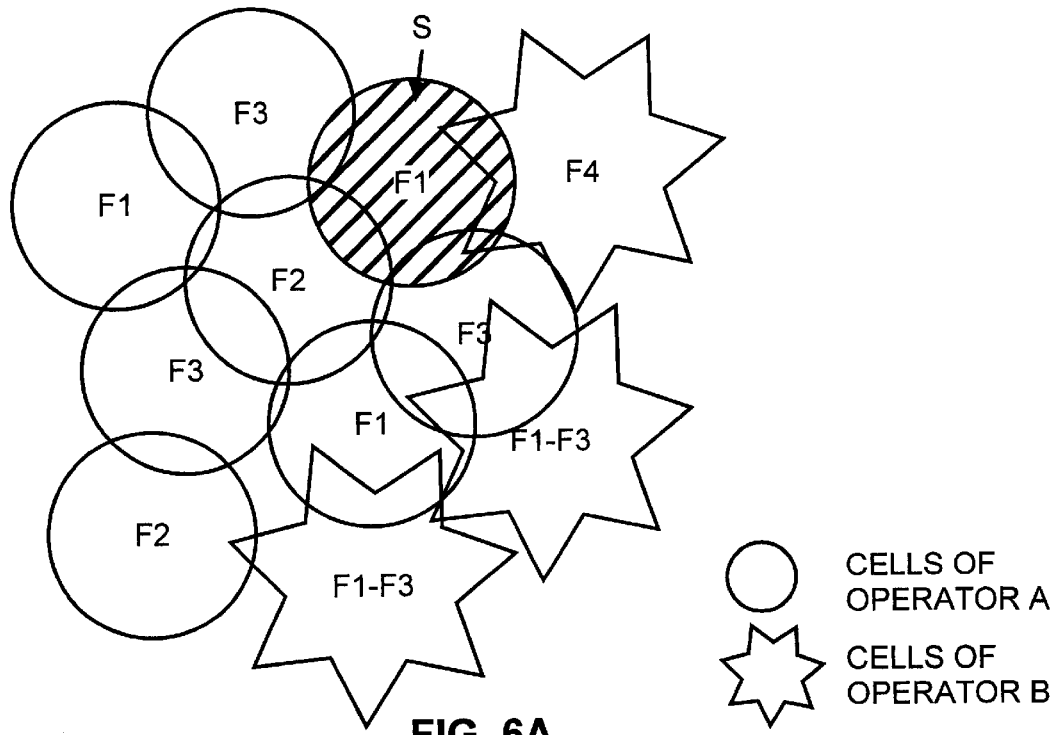
FIGS. 6a and 6b illustrate cell structures in two networks.

The second level in occupying a new frequency is changing the cell structure of the network by the beacon technique. The operation of this technique will be explained with reference to FIGS. 6A and 6B. FIG. 6A shows a situation where the networks of two different operators, operators A and B, have overlapping coverage areas. The network of operator A utilizes frequencies F1, F2 and F3 and the network of operator B frequencies F4, F5 and F6. The frequencies utilized by the cells are indicated within the cells. The operators have no knowledge of one another's cell structure and traffic load situation.

The cell denoted by hatching in the figure has only one frequency F1 at its disposal. However, the capacity requirement of the cell increases in such a way that this frequency is not sufficient to serve the users of the network. The cell must therefore have additional capacity. In the situation of FIG. 6A, however, the other frequencies F2 and F3 allocated for the use of the network cannot be used in cell S without the increase in the interference level considerably hampering the operation of the entire network. Hence, additional frequencies must be allocated for the use of the network in the area of the cell.

Figure 6B:
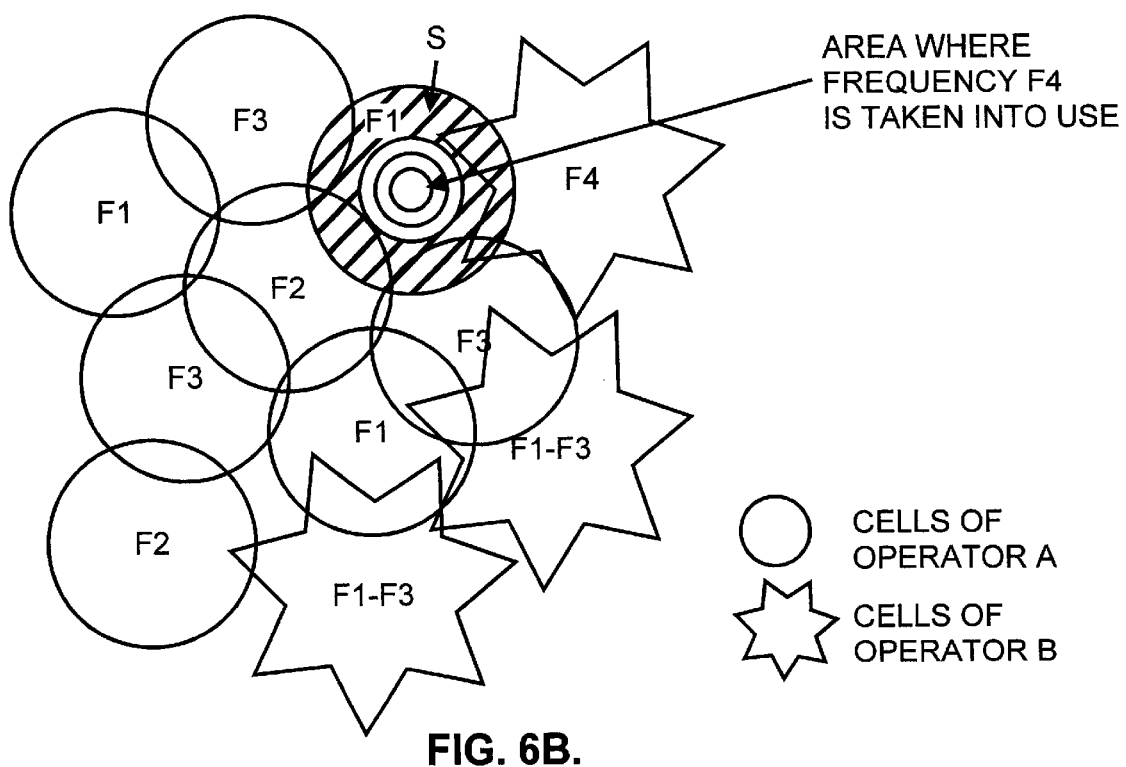

In the method, the best frequency is first selected on the basis of signal measurements, on which frequency a beacon signal is set up. In this case, this frequency is the frequency F4. The resultant situation is shown in FIG. 6B. The new frequency is occupied with a beacon signal having a low transmit power (below the limit BeaconPower1). The new occupied frequency is added on a neighbour list, which causes the mobile stations to start measuring said frequency. Mobile stations at a distance of a good radio link from the base station are able to receive the beacon signal in sufficient strength and detect the synchronization bursts provided therein. The area within which the signal is detected in sufficient strength defines a new cell, denoted in FIG. 6B as the smallest circle. The mobile stations transmit a random access request to establish a connection and for correcting the burst timing. The base station identifies the mobile stations located in the "new cell" and starts communicating with them.

The mobile stations transferring to the new cell diminish the load on the old cell, relieve the interference situation, and provide more degrees of freedom for an advantageous channel arrangement. On the other hand, as the new cell operates at low power it offers sufficient quality to a limited group of mobile stations and does not cause interference to another operator operating further away at the same frequency.

If a sufficient portion of the traffic does not transfer to the "new cell", the cell is enlarged by increasing the transmit power to a threshold value (BeaconPower2). The cell will then be larger in size. In FIG. 6B, this is represented by the second-smallest circle.

The outcome of the procedure is dependent on the number of mobile stations transferring to the cell and on the amount of traffic used by them. Transfer of even one mobile station will ease the situation considerably if the traffic load related to the mobile station is high. On the other hand, for example at an intersection the outcome of 'angling' might be a large number of mobile stations in the "new" small cell, with the result that the advantage gained from transferred load is great even though the mobile stations only have a speech connection. The enlarging of the cell can be continued with reasonable changes in the threshold value until the outcome is sufficiently good in view of load distribution. If the new cell will have a size corresponding to the maximum permitted power (regulated), this is acceptable if one does not simultaneously end up in a situation where overlapping network operator operation starts interfering with the quality of connections to be established, so that the useful capacity in the cell deteriorates.

Once the cell size has been selected, it is kept constant by means of the threshold value. If the mobile stations are on the move, they can effect a handover to another cell in the normal way. If the number of handovers increases, i.e. the mobile stations tend to move away from the cell, it is possible to select the next larger cell size. As a result, the number of handovers from the cell will decrease.

The dynamic allocation of transmission resources between users in accordance with the invention can be used irrespective of the channel division method. Different networks participating in sharing the same transmission resource can also utilize different channel division methods. One of the networks can use CDMA division and another TDMA division, for example. If TDMA division is used in several networks and the networks are synchronized with sufficient precision, the resources can be divided between the networks besides the frequency domain also in the time domain. In such a case, for instance half of the time slots at the same frequency would be allocated for the use of a first operator and the remainder for the use of a second operator, for instance.

Likewise, the invention is independent of the duplexing methods used in the network. Duplexing methods refer to arrangements whereby the channels employed by the different transmission directions are separated from one another. Such methods include frequency division duplex FDD, in which different frequencies are used in the different transmission directions, and time division duplex TDD, in which the transmissions of the different directions are separated in time. Different networks participating in sharing the same transmission resource can also use different duplexing methods. Since TDD systems are often used on unlicensed bandwidth, the invention is utilized with particular advantage in TDD systems.

The method in accordance with the invention for allocating data transmission resources is possibly at its most advantageous in sharing radio resources between wireless networks, such as mobile communications networks. However, the invention is not restricted thereto but can also be used for dividing other transmission resources than a radio frequency band between several different operators and/or systems. One example of such an arrangement is a trunk line of a circuit-switched telephone network jointly owned by several telephone operators, the channels of which are allocated for the use of the different operators in accordance with their current transmission requirement.

What is claimed is:

1. A method for dividing data transmission resources between users in a system comprising several networks in which the networks and their users can establish bi-directional connections between them and a given number of transmission resources are allocated for the use of the system, comprising:

employing at least one parameter for dynamically allocating transmission resources which are usable by a plurality of channel allocation schemes, for the use of the different networks which each cover a plurality of cells, wherein said transmission resource allocation being performed dynamically in such a manner that a minimum resource that the network will always have at its disposal is set for at least some of the networks, and allocating in each network from the resources allocated for the use of that network channels for the connections of the users of the network, wherein the dynamic allocation of transmission resources between the networks is performed in a distributed manner in such a way that each network independently allocates transmission resources to itself, and wherein the transmission resources are divided into carrier frequencies, and as the transmission capacity of the network is increased dynamically:

a new carrier frequency is taken into the use of the network, a beacon signal is transmitted at the new carrier frequency at a transmit power substantially lower than that used at the other carrier frequencies, connections that achieve a sufficiently good connection quality at the new carrier frequency are transferred to use a channel operating at the new carrier frequency.

2. A method for dividing data transmission resources between users in a system comprising several networks in which the networks and their users can establish bi-directional connections between them and a given number of transmission resources are allocated for the use of the system, comprising:

employing at least one parameter for dynamically allocating transmission resources which are usable by a plurality of channel allocation schemes, for the use of the different networks which each cover a plurality of cells, wherein said transmission resource allocation being performed dynamically in such a manner that a minimum resource that the network will always have at its disposal is set for at least some of the networks, and allocating in each network from the resources allocated for the use of that network channels for the connections of the users of the network, wherein the dynamic allocation of transmission resources between the networks is performed in a distributed manner in such a way that each network independently allocates transmission resources to itself, and wherein the transmission resources are divided into carrier frequencies, and as the transmission capacity of the network is increased dynamically:

a new carrier frequency is taken into the use of the network, a beacon signal is transmitted at the new carrier frequency at a transmit power substantially lower than that used at the other carrier frequencies, connections that achieve a sufficiently good connection quality at the new carrier frequency are transferred to use a channel operating at the new carrier frequency, wherein a threshold is set for the amount of traffic to be transferred to use the channels of the new carrier frequency, the amount of traffic that has transferred to use the channels of the new carrier frequency is examined, and the transmit power of the beacon signal transmitted at the carrier frequency is increased if the amount of traffic that has transferred to use the new carrier frequency is below the threshold.

3. A method for dividing data transmission resources between users in a system comprising several networks in which the networks and their users can establish bi-directional connections between them and a given number of transmission resources are allocated for the use of the system, comprising:

employing at least one parameter for dynamically allocating transmission resources which are usable by a plurality of channel allocation schemes, for the use of the different networks which each cover a plurality of cells, wherein said transmission resource allocation being performed dynamically in such a manner that a minimum resource that the network will always have at its disposal is set for at least some of the networks, and allocating in each network from the resources allocated for the use of that network channels for the connections of the users of the network, wherein the dynamic allocation of transmission resources between the networks is performed in a distributed manner in such a way that each network independently allocates transmission resources to itself, and wherein the transmission resources are divided into carrier frequencies, and as the transmission capacity of the network is increased dynamically:

a new carrier frequency is taken into the use of the network, a beacon signal is transmitted at the new carrier frequency at a transmit power substantially lower than that used at the other carrier frequencies, connections that achieve a sufficiently good connection quality at the new carrier frequency are transferred to use a channel operating at the new carrier frequency, wherein a threshold is set for the amount of traffic to be transferred to use the channels of the new carrier frequency, the amount of traffic that has transferred to use the channels of the new carrier frequency is examined, and the transmit power of the beacon signal transmitted at the carrier frequency is increased if the amount of traffic that has transferred to use the new carrier frequency is below the threshold, wherein the amount of transferred traffic is determined as the number of connections that have transferred to use the channels of the new carrier frequency.

4. A method for dividing data transmission resources between users in a system comprising several networks in which the networks and their users can establish bi-directional connections between them and a given number of transmission resources are allocated for the use of the system, comprising:

employing at least one parameter for dynamically allocating transmission resources which are usable by a plurality of channel allocation schemes, for the use of the different networks which each cover a plurality of cells, wherein said transmission resource allocation being performed dynamically in such a manner that a minimum resource that the network will always have at its disposal is set for at least some of the networks, and allocating in each network from the resources allocated for the use of that network channels for the connections of the users of the network, wherein the dynamic allocation of transmission resources between the networks is performed in a distributed manner in such a way that each network independently allocates transmission resources to itself, and wherein the transmission resources are divided into carrier frequencies, and as the transmission capacity of the network is increased dynamically:

a new carrier frequency is taken into the use of the network, a beacon signal is transmitted at the new carrier frequency at a transmit power substantially lower than that used at the other carrier frequencies, connections that achieve a sufficiently good connection quality at the new carrier frequency are transferred to use a channel operating at the new carrier frequency, wherein a threshold is set for the amount of traffic to be transferred to use the channels of the new carrier frequency, the amount of traffic that has transferred to use the channels of the new carrier frequency is examined, and the transmit power of the beacon signal transmitted at the carrier frequency is increased if the amount of traffic that has transferred to use the new carrier frequency is below the threshold, wherein the amount of transferred traffic is determined as the combined traffic load of connections that have transferred to use the channels of the new carrier frequency.

5. A method for dividing data transmission resources between users in a system comprising several networks in which the networks and their users can establish bi-directional connections between them and a given number of transmission resources are allocated for the use of the system, comprising:

employing at least one parameter for dynamically allocating transmission resources which are usable by a plurality of channel allocation schemes, for the use of the different networks which each cover a plurality of cells, wherein said transmission resource allocation being preformed dynamically in such a manner that a minimum resource that the network will always have at its disposal is set for at least some of the networks, and allocating in each network from the resources allocated for the use of that network channels for the connections of the users of the network, wherein the dynamic allocation of transmission resources between the networks is performed in a distributed manner in such a way that each network independently allocates transmission resources to itself, and wherein the transmission resources are divided into carrier frequencies, and as the transmission capacity of the network is increased dynamically:

a new carrier frequency is taken into the use of the network, a beacon signal is transmitted at the new carrier frequency at a transmit power substantially lower than that used at the other carrier frequencies, connections that achieve a sufficiently good connection quality at the new carrier frequency are transferred to use a channel operating at the new carrier frequency, wherein a threshold is set for the number of connections transferring away from the channels of the new carrier frequency per time unit, the number of connections transferring away from the channels of the new carrier frequency per time is examined, and the transmit power of the beacon signal transmitted at the carrier frequency is increased if the number of connections transferring away from the channels of the new carrier frequency per time exceeds the threshold.

* * * * *